April 23, 1963 W. BRODBECK 3,086,426
ANGULARLY AND RECTILINEARLY ADJUSTABLE TOOL CARRIER
Filed Sept. 4, 1958
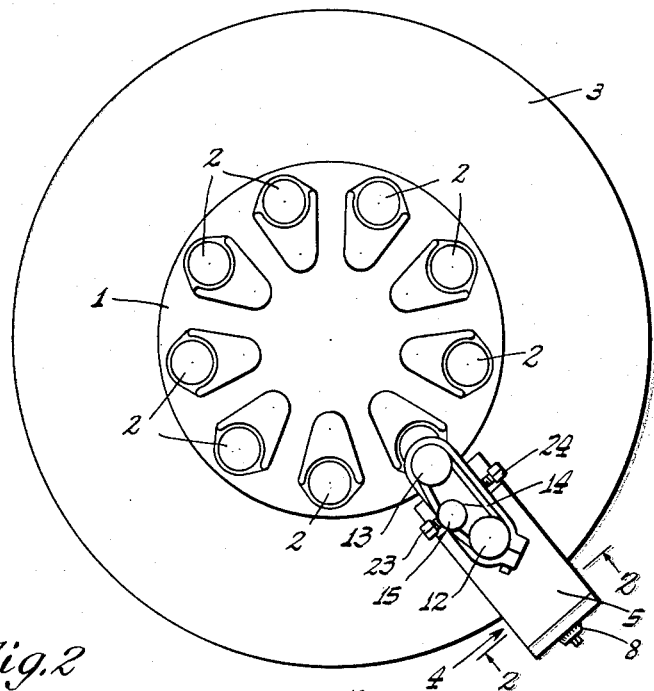
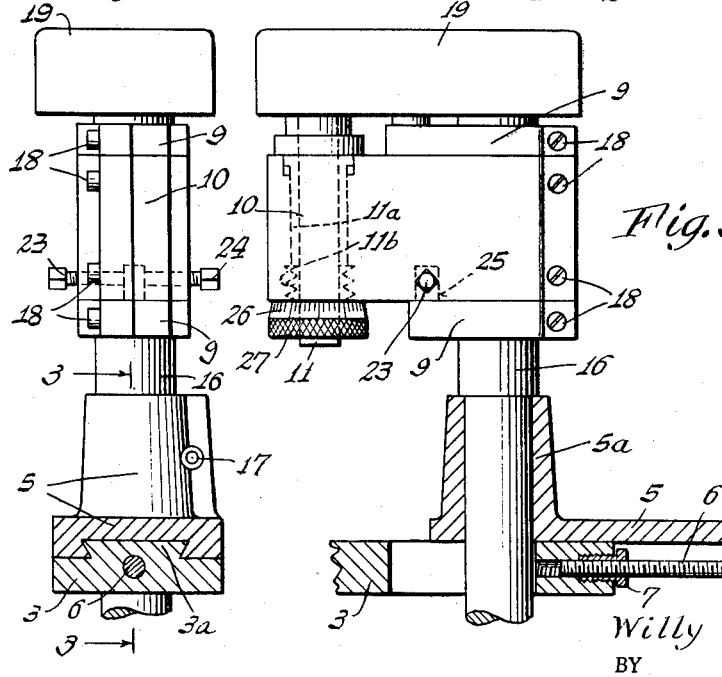
INVENTOR.
Willy Brodbeck
BY
Munn, Liddy, Daniels & March
ATTORNEYS

United States Patent Office 3,086,426
Patented Apr. 23, 1963

3,086,426
ANGULARLY AND RECTILINEARLY ADJUSTABLE TOOL CARRIER
Willy Brodbeck, Calmbach (Enz), Germany, assignor to Alfred Gauthier G.m.b.H., Calmbach (Enz), Germany, a corporation of Germany
Filed Sept. 4, 1958, Ser. No. 758,944
Claims priority, application Germany Sept. 14, 1957
5 Claims. (Cl. 90—17)

This invention relates to machine tools of the type utilizing a plurality of tool units for performing operations simultaneously on different workpieces which are supported by a fully rotatable workpiece carrier, said carrier being capable of indexing movements to place it consecutively in a number of different rotative positions corresponding to the number of workpiece supports mounted on the carrier.

An object of the invention is to provide a novel and improved machine tool of the type generally set forth above, comprising a plurality of workpiece supports or holders mounted on a rotary carrier or dial member by which the workpieces are sequentially presented at a number of work-performing stations, said machine tool being so arranged that it may be especially easily and quickly set up and adjusted, and also reset in accordance with the various manufacturing requirements. Another object of the invention is to provide an improved machine tool in accordance with the foregoing and embracing the use of a plurality of tool units at a number of work-performing stations, wherein the different working processes and machining or engraving operations required at the various work-performing stations correlated to the different angular positions of the workpiece carrier member or dial may be readily carried out by the use of novel, similarly-constructed or duplicate tool units.

In accomplishing the above objects, in accordance with the invention, I provide a novel tool unit assemblage which is mounted on or carried by the frame or base of the machine tool, as by a fixed guide or track, the said assemblage including a base or carriage part which is movably carried by the said guide and shiftable along the latter by means of a fine adjustment or setting device. The tool unit assemblage further comprises a tool carrier consisting of two parts which are movable with respect to each other, preferably with relative rotative motion. The said two-part tool carrier, moreover, is mounted on the carriage for adjusting, rotative movement with respect thereto and also for relative translational movement with respect thereto in a direction longitudinally of the axis of the adjusting rotative movement.

Such organization is of especial advantage in machine tool where a rotary, fully-rotatable workpiece carrier member or dial is associated with a plurality of operation-performing stations, since the individual tool-unit assemblages which are coordinated to the work-performing stations may thus be easily, quickly and precisely adjusted to the operative positions which are necessary to carry out the desired machining, milling and/or engraving operations. In consequence, the inherent advantages of this type of machine tool, as regards the economical, serial machining of workpieces, are supplemented by the further important feature which enables the machine tool to be quickly, easily and economically set up, adjusted and reset as required to produce the desired machining operations. Such combination of advantages and features therefore represents an optimum degree of economy, in the use of machine tool.

In carrying out the invention, a compact and space-saving construction is obtained in the machine tool, as well as a construction which is strong, sturdy and conductive to easy and quick setting-up operations, by mounting the two-part tool carrier on a column or post which is not only turnable in but also axially or longitudinally shiftable with respect to a bearing guide rigid on the said carriage. Moreover, a further advantage is obtained when the two parts of the tool carrier are arranged so that the relative rotative movements thereof are about an axis which substantially coincides with the longitudinal axis of the said column, together with means by which each of the said parts may be fixed or locked in different adjusted positions.

In conjunction with such mounting of the tool carrier on a column there is made possible a simplified and yet sturdy and reliable setting means for effecting a precise positioning of the tool carried by the tool unit, said setting means having a minimum number of components, by the provision on the two parts of the tool carrier of chucking devices (as for example split collars or binding screws, or other gripping means) which are adapted to grip the column and to be releasable at will, and by the further provision of precision adjusting means for effecting minute adjustments of one of said parts with respect to the other. A simple and desirable type of precision adjustment device which involves few components and is strong and sturdy while at the same time extremely accurate, is provided herein in the form of opposed screws which are carried by one of the parts of the tool carrier and an abutment which is interposed between and engageable with the screws and is carried by the other of the said parts. The two adjustment screws may be advantageously disposed in alignment with each other, with the juxtaposed ends thereof engaging opposite sides of the stop or abutment.

Additional advantages and a further increase in the flexibility and freedom with which the tool units may be set and adjusted are obtained, in accordance with the invention, by mounting the tool spindle on one of the tool carrier parts in such a manner that it is axially or longitudinally movable and adjustable, thereby to adjustably advance or retract the cutting tool or bit carried by the spindle.

An embodiment of the invention is illustrated in the figures.

FIGURE 1 is a top, plan view showing schematically a machine tool constructed in accordance with the invention and having a fully-rotatable workpiece carrier or dial provided with means such as holders or supports for mounting a plurality of workpieces disposed in a circle about the axis of rotation. The machine of FIGURE 1 is of the type capable of utilizing a plurality of tool units for performing simultaneous operations on different workpieces; however, for clarity of illustration only one such tool unit is shown, the cover of said unit having been removed.

FIG. 2 is a view partly in side elevation and partly in vertical section, taken on the line 2—2 of FIG. 1.

FIG. 3 is a view partly in side elevation and partly in vertical section, taken on the line 3—3 of FIG. 2 and showing a novel tool unit as provided by the invention.

Referring now to FIG. 1, the improved machine tool shown therein comprises a frame or base 3 on which there is rotatably mounted a rotary workpiece carrier or dial 1, turnable about a central vertical axis. Disposed in a circle about the vertical axis of the carrier 1 and spaced from each other are workpiece supports or holders 2, said holders being equispaced so that the central angles defined by any two adjoining supports are all equal. In the illustrated embodiment of the invention the supports 2 are adapted to carry workpieces of circular shape (not shown). In conjunction with this organization the machine tool may be provided with a plurality of individual tool units, one such unit being indicated generally by the numeral 4 in FIG. 1. It will be understood that as many of the units 4 may be provided and utilized as there are workpiece supports or holders 2.

The units 4 are advantageously mounted on the fixed frame or base 3 of the machine tool. Only one such unit 4 is illustrated herein for reasons of clarity. It will be understood that the workpieces are advanced step by step to the machining stations by the carrier 1, and that in the process of effecting the various, different operations which are to be performed on the workpieces each time that the carrier or dial 1 is locked at rest after being advanced or indexed, the workpiece supports or holders 2 may be suitably shifted or positioned, following their advance from one tool unit 4 to the next.

In accordance with the present invention, each of the tool units 4 comprises a base or carriage member 5 which is shiftable or slidable in a fixed guide on the machine frame, through the use of a setting device, and comprises a tool carrier having two parts which are shiftable or rotatably movable with respect to each other, The two-part tool carrier is also movably carried on the said carriage member 5, being mounted for adjusting rotative movement with respect thereto and also for relative translational movement in a direction longitudinally of the axis of the said adjusting rotative movement. Also, the said two-part tool carriers may be rigidly secured in various adjusted positions on the carriage member.

In the illustrated embodiment of the invention the carriage 5 of the tool unit 4 is movable in a plane which is normal to the axis of rotation of the workpiece carrier or dial 1, and is preferably shiftable radially with respect to the said axis. The carriage 5 has a dovetail slot engaging and receiving a dovetail guide 3a which is rigid on the machine frame or base 3, for the purpose of effecting the said radial movement in the normal plane mentioned. In order to adjustably shift the carriage 5 the latter is provided with a threaded spindle 6 which is turnably carried on a depending front portion of the carriage, as illustrated in FIG. 3. The spindle 6 screws into a threaded bushing 7 which is carried by the machine table or frame 3. For the purpose of turning or actuating the spindle 6 there is provided a manually operable knob 8 which is carried by the spindle and is provided with a usual type of dial having graduations constituting a scale.

In the illustrated construction of the machine tool, the two relatively movable or adjustable parts of the tool carrier are indicated by the numerals 9 and 10. As shown, the part 10 of the tool carrier is provided with a tool spindle 11, whereas the part 9 carries a motive means such as an electric motor, for driving the spindle 11. The drive device for the spindle may be constituted in the well-known manner, and may comprise two pulleys 12 and 13 (FIG. 1), the pulley 12 being connected with the motive means while the pulley 13 is carried by the spindle 11. A driving belt 14 passes around the pulleys 12 and 13, and the tension of the belt 14 may be regulated by an idler wheel 15 in the usual manner. In FIGS. 2 and 3 the said drive device is enclosed in a cover 19.

As shown in FIGS. 2 and 3 the carriage 5 is provided with a tubular, cylindrical guide bushing or bearing 5a, in which there is supported an upright post or column 16, said column being turnable in the bushing 5a and being also capable of vertical translational movement at right angles to the radial movement of the carriage. The column 16 mounts the tool carrier comprising the two portions or parts 9 and 10. For the purpose of securing the column 16 in different adjusted positions, the bushing 5a of the carriage 5 is provided as a chucking device, which may be for example a split collar or other gripping means adapted to be tightened about the column 16 by means of a screw 17 (FIG. 2).

Further, in the illustrated embodiment of the invention the two parts 9 and 10 of the carrier are joined to each other by a fastening device, for relative rotational movement in a simple manner which requires very few components. In effecting this, the parts 9 and 10 are both carried by the column 16, being mounted thereon by means of chucking devices which may be in the form of split collars or other gripping means. The said chucking portions of the parts 9 and 10 are each provided with two screws 18, as clearly seen in FIGS. 2 and 3. By means of the screws 18 the chucking devices may be tightened about the column 16 to fixedly secure the parts 9 and 10 to the column. When the screws 18 are loosened, the two parts 9 and 10 may be rotatably shifted with respect to each other about the column 16 as an axis. This relative shifting movement of the said two parts serves for effecting in a simple and quick manner a precise setting of the tool spindle 11.

In effecting such precise setting I further provide an adjusting or setting device, which in the illustrated embodiment of the invention comprises two aligned opposed screws 23 and 24 mounted on the part 10 of the tool carrier, said screws being preferably disposed in alignment with each other, with their juxtaposed ends spaced apart a certain distance. Interposed between the said juxtaposed ends of the screws and in engagement therewith is a stop arm or abutment 25 which is carried by the part 9 of the tool carrier.

It will now be understood that with the part 10 of the tool carrier loose on the column 16, as by loosening the appropriate set of screws 18, adjustment of the screws 23 and 24 may effect a precise positioning of the spindle 11 in a direction laterally of its axis and through an arc. When the desired positioning of the spindle 11 has been effected the draft screws 18 may be again tightened thereby to securely lock the said part 10 on the column 16.

A precision setting device constructed in accordance with the foregoing involves relatively few components of simple construction. Moreover, it is extremely sturdy and possesses a high degree of accuracy in enabling the spindle 11 to be precisely adjusted so as to meet critical manufacturing requirements.

I further provide means to effect an additional adjustment of the tool or bit which is carried by the spindle 11. In the illustrated construction such additional adjustment is had by mounting the spindle 11 in a top bushing 11a and a threaded bottom bushing 11b which latter is screwed into the part 10 so that the bushings and shaft may be vertically shiftable, in the direction of the shaft axis. To effect such shifting it is merely necessary to turn the bottom bushing 11b which as shown in FIG. 3, may have for this purpose a knurled setting knob 27 provided with a graduated scale 26.

I claim:
1. In a machine tool, in combination, a base, at least one fixed guide fixedly carried by said base, a carriage reversibly movable on said fixed guide, adjusting means connected to said carriage for shifting said carriage along said guide minute amounts, a tool carrier, an adjustable carrier support means carried by said carriage for supporting and adjusting said tool carrier relative to said carriage, said tool carrier comprising two cooperatively movable parts connected to said adjustable carrier support means, said carrier support means being adapted to adjust said tool carrier relative to said carriage for relative angular movement therebetween and also for relative translational movement longitudinally therebetween along the axis of said relative angular movement therebetween, said tool carrier further having a fastening device joining said two cooperative parts for effecting relative rotative adjusting movement with respect to each other and also with respect to said carrier, and means for locking said tool carrier in different adjusted positions with respect to said carriage.

2. In a machine tool, in combination, a base, at least one fixed guide fixedly carried by said base, a carriage reversibly movable on said fixed guide, adjusting means connected to said carriage for shifting said carriage along said guide minute amounts, a tool carrier, an adjustable carrier support means carried by said carriage for supporting and adjusting said tool carrier relative to said carriage, said carrier support means including an upright column, and a tubular bearing guide fixed on said carriage for receiving said column, said column being adjustably mounted within said bearing guide for relative angular and longitudinal movement relative thereto, said tool carrier comprising two cooperating relatively movable parts connected to said column and each of said parts being relatively turnable about an axis substantially coinciding with the axis of said column, releasable means for locking the said two parts of said tool carrier relative to each other in different adjusted positions to said column, and means for releasably locking said column in different adjusted positions thereof with respect to said bearing guide means carried on said carriage.

3. The invention as defined in claim 2, in which the means joining said two parts of said tool carrier to each other include said column, said means for locking said tool carrier parts including releasable chucking devices on said parts, said chucking devices being engageable with said column and adapted to grip the same, and a precision setting device cooperatively associated between said parts for shifting one of said parts with respect to the other by minute amounts.

4. The invention as defined in claim 3 in which the precision setting device includes a pair of opposed screws carried by one of said parts, and includes an abutment interposed between and engageable with said screws and carried by the other of said parts.

5. The invention as defined in claim 1 and including a spindle carried in one of said two parts of said tool carrier, and means coaxially connected with said spindle for adjustably axially shifting said spindle relative to said one tool part.

References Cited in the file of this patent

UNITED STATES PATENTS

| | | |
|---|---|---|
| 1,499,084 | Sundstrand | June 24, 1924 |
| 1,848,914 | Trosch | Mar. 8, 1932 |
| 1,976,103 | Archea | Oct. 9, 1934 |
| 2,078,166 | Schwerin | Apr. 20, 1937 |
| 2,324,416 | Murray | July 13, 1943 |
| 2,352,227 | Sarossy | June 27, 1944 |
| 2,392,070 | Snyder | Jan. 1, 1946 |
| 2,535,908 | Epplin | Dec. 26, 1950 |

FOREIGN PATENTS

| | | |
|---|---|---|
| 144,753 | Australia | Jan. 14, 1952 |